United States Patent [19]

O'Neill et al.

[11] 4,073,777

[45] Feb. 14, 1978

[54] RADIATION CROSSLINKABLE POLYESTER AND POLYESTERAMIDE COMPOSITIONS CONTAINING SULFONATE GROUPS IN THE FORM OF A METALLIC SALT AND UNSATURATED GROUPS

[75] Inventors: George J. O'Neill; James G. Pacifici, both of Kingsport, Tenn.

[73] Assignee: Eastman Kodak Company, Rochester, N.Y.

[21] Appl. No.: 541,965

[22] Filed: Jan. 17, 1975

[51] Int. Cl.² .............................................. C08G 63/20
[52] U.S. Cl. ............................ 260/75 S; 204/159.16; 204/159.19; 260/29.2 UA; 260/75 UA; 428/480
[58] Field of Search .................... 260/75 S, 75 UA

[56] References Cited

U.S. PATENT DOCUMENTS

| | | | |
|---|---|---|---|
| 3,459,716 | 8/1969 | Schaefer | 260/75 S |
| 3,525,715 | 8/1970 | Hrach | 260/75 UA |
| 3,734,874 | 5/1973 | Kibler | 260/75 S |
| 3,853,820 | 12/1974 | Vachon | 260/75 S |
| 3,899,470 | 8/1975 | McGee | 260/75 S |
| 3,900,527 | 8/1975 | King | 260/75 S |
| 3,923,928 | 12/1975 | Atkins | 260/75 UA |
| 3,936,389 | 2/1976 | King | 260/75 S |

*Primary Examiner*—Paul R. Michl
*Attorney, Agent, or Firm*—Clyde L. Tootle; Daniel B. Reece, III

[57] ABSTRACT

Radiation crosslinkable, water-dispersable polyesters and polyesteramides derived from monomer components which include dicarboxylic acids, poly(ethylene glycol), monomer components substituted with a sulfonate metal salt group and $\alpha,\beta$-unsaturated acids. A typical polyester is composed of 80 mole parts of isophthalic acid, 10 mole parts of 4-carboxycinnamic acid, 10 mole parts of 5-sodiosulfoisophthalate, and 100 mole parts diethylene glycol. The polyesters and polyesteramides may also include monomer components such as hydroxycarboxylic acid, aminocarboxylic acid, aminoalcohol, glycol, diamine or combinations of such components. Such polymers are useful as adhesives, coating materials, films, packaging materials and other products. The polymers can be dissolved, dispersed or otherwise dissipated in water or aqueous solutions, dried and subsequently cured by radiation.

15 Claims, No Drawings

RADIATION CROSSLINKABLE POLYESTER AND POLYESTERAMIDE COMPOSITIONS CONTAINING SULFONATE GROUPS IN THE FORM OF A METALLIC SALT AND UNSATURATED GROUPS

The present invention relates to the preparation and some uses of radiation crosslinkable linear, water-dispersible polymers. More particularly, this invention relates to radiation crosslinkable or curable water-dispersible polyesters and polyesteramides or modified polyesters which can be prepared by reacting a glycol component, a dicarboxylic acid component, an unsaturated component, and at least one difunctional comonomer wherein a portion of the comonomer contains a sulfonate salt group attached to an aromatic nucleus.

The incorporation of extremely low concentrations of alkali metal salts of sulfoisophthalic acid or other sulfoacids into a fiberforming polyester or the like for the purpose of improving the dyeability of the fiber is known in the prior art. Also, it is known to prepare water-dissipatable polyester or polyesteramides which are prepared by reacting a glycol or amine component, a dicarboxylic acid component and at least one difunctional comonomer wherein a portion of the comonomer contains a sulfonate salt group attached to the aromatic nucleus. Such polyesters and polyesteramides are water-dispersible and have found utility as finishing and bonding agents for textile finishes, for example. When these prior art water-dispersible polyesters and polyesteramides are used as textile finishes, the polyester and polyesteramides are applied from an aqueous dispersion to the fabric. The fabric is then dried. In order to cure the finish so that the finish is durable to laundering and dry cleaning, it is necessary that the dried fabric containing the finish be heated in an oven at elevated temperatures, such as 340° F., for about 90 seconds in order to cure or crosslink the finish.

In view of the recent energy shortage, producers making products requiring gas and oil fried ovens to dry and cure commercial products such as textiles containing textile finishes requiring heat curing have been forced to consider alternate methods of curing. One such method of curing is ultraviolet curing systems which save about 60% of the energy required to cure coatings and finishes by thermal processes. Not only do the ultraviolet light cure systems reduce the energy required to cure coatings and finishes, but also eliminate the space requirements and maintenance required for thermal ovens and equipment. Additional savings are realized with ultraviolet cure systems since such cure systems can effect a cure of a coating or finish in much less time than it takes for conventional thermal cure. Therefore, to provide radiation curable water-dispersible, polyester and polyesteramide or modified polyesters useful for such coatings, adhesives and finishes would be an advance in the state of the art.

It is, therefore, an object of the present invention to provide unsaturated, water-dispersible polymeric compositions which are radiation curable.

Another object of the invention is to provide unsaturated, water-dispersible polyester and polyesteramides which can be used as ultraviolet curable coatings, adhesives, films and textile finishes.

A further object of this invention is to provide unsaturated water-dispersible polyester and polyesteramides which are durable finishes for textile fabrics.

A still further object of the present invention is to provide a fabric that has a durable finish that has been applied from water and has been crosslinked by ultraviolet light.

One still further object of this invention is to provide a method for obtaining a fabric having a durable finish that has been finished or cured using lower energy, faster rates and effecting greater economics of space and maintenance costs than conventional thermal processes.

Further objects and advantages of the invention will be apparent to those skilled in the art from the accompanying disclosure and claims.

In accordance with the present invention, a radiation cross-linkable linear, water-dissipatable meltable polyester or polyesteramide can be prepared from components which include a glycol component, a dicarboxylic acid component, a difunctional sulfo monomer component, and an $\alpha,\beta$-unsaturated mono- or dicarboxylic acid. The components used in the polymer condensation products of this invention are all essentially difunctional, which means that they cannot contain other substituents such as isocyanate groups since any such third functional group would mean that the compound was trifunctional.

More especially, this invention provides a radiation cross-linkable linear, water-dissipatable polymer having carbonyloxy or carbonylamide interconnecting groups in the linear molecular structure wherein up to 80% thereof may be carbonylamido linking groups, said polymer having an inherent viscosity of at least about 0.1 measured in a 60/40 parts by weight solution of phenol/tetrachloroethane at 25° C. and at a concentration of about 0.25 gram of polymer in 100 ml. of said solvent. The polyester of polyesteramide comprises at least (a), (b), (c), (d) and may also contain (e) from the following components:

a. at least one difunctional dicarboxylic acid;

b. at least one difunctional glycol containing two —CH$_2$—OH groups of which at least 15 mole percent is a poly(ethylene glycol) having the structural formula:

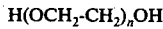

$n$ being an integer in the range between about 2 and about 20;

c. An amount sufficient to provide said water-dissipatable characteristic of said polymer of at least one difunctional sulfomonomer containing at least one metal sulfonate group attached to an aromatic nucleus wherein the functional groups are hydroxy, carboxyl or amino;

d. An unsaturated mono- or dicarboxylic acid; and e. From non to about 80 mole percent of a difunctional hydroxycarboxylic acid having one —CH$_2$-OH group, an aminocarboxylic acid having one —NRH group, an amino-alcohol having one —CR$_2$—CH group and one —NRH group, a diamine having two —NRH groups, or a mixture thereof, wherein each R is an H atom or a 1-4 carbon alkyl group. The components (a), (b), (c), (d) and (e) being organic compounds, each of which contains a hydrocarbon moiety which has from none up to six nonfunctional groups, and where (a) represents all of the carboxy functional groups in said polymer from all of said components and (b) represents all of the functional hydroxy and functional amino groups in the polymer from all of said components, the ratio of (a) to (b) in the polymer is substantially unity, whereby said polymer is essentially linear. According to one aspect of this invention, there is provided a polymer which is a polyester wherein the difunctional sulfomonomer (c) is a dicarboxylic acid and constitutes about 8 mole percent to about 50 mole percent based on the sum of (1) the moles of the total dicarboxylic acid content of components (a) and (b), and (2) one half of the moles of any hydroxycarboxylic acid content from said component (e).

According to more specific embodiments, polyesters are provided wherein said difunctional sulfo-monomer (c) is a glycol and constitutes about 8 mole percent to about 50 mole percent based on the sum of (1) the total glycol content measured in moles of (b) and (c), and (2) one half of the moles of any hydroxycarboxylic acid content from said component (e).

Examples of suitable poly(ethylene glycols) include diethylene glycol, triethylene glycol, tetraethylene glycol, and pentaethylene, hexaethylene, heptaethylene, octaethylene, nonaethylene, and decaethylene glycols, and mixtures thereof. Preferably the poly(ethylene glycol) employed in the polyesters or polyesteramides of the present invention is diethylene glycol or triethylene glycol or mixtures thereof. The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids. If terephthalic acid is used as the dicarboxylic acid component of the polyester, superior results are achieved when at least 5 mole percent of one of the other acids listed above is also used.

It should be understood that use of the corresponding acid anhydrides, esters, and acid chlorides of these acids is included in the term "dicarboxylic acid." Examples of these esters include dimethyl 1,4-cyclohexanedicarboxylate; dimethyl 2,5-naphthalenedicarboxylate; dibutyl 4,4'-sulfonyldibenzoate; dimethyl isophthalate; dimethyl terephthalate; and diphenyl terephthalate. Copolyesters may be prepared from two or more of the above dicarboxylic acids or derivatives thereof.

The difunctional sulfo-monomer component of the polyester or polyesteramide may advantageously be a dicarboxylic acid or an ester thereof containing a metal sulfonate group or a glycol containing a metal sulfonate group or a hydroxy acid containing metal sulfonate group.

Advantageous difunctional sulfo-monomer components are those wherein the sulfonate salt group is attached to an aromatic acid nucleus such as a benzene, naphthalene, diphenyl, oxydiphenyl, sulfonyldiphenyl, or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate having the general formula:

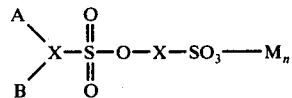

wherein $x$ is a trivalent aromatic radical derived from a substituted or unsubstituted aromatic hydrocarbon, Y is a divalent aromatic radical derived from a substituted or unsubstituted aromatic hydrocarbon, A and B are carboalkoxy groups containing 1 to 4 carbon atoms in the alkyl portion or a carboxy group, the metal ion M is $Li^+$, $Na^+$, $K^+$, $Mg^{++}$, $Ca^{++}$, $Ba^{++}$, $Cu^{++}$, $Fe^{++}$, $Fe^{++}$, and $n$ is 1 for monovalent M or 2 for divalent M or 3 for trivalent M. When a monovalent alkali metal ion is used the resulting polyesters or polyesteramides are less readily dissipated by cold water and more rapidly dissipated by hot water. When a divalent or a trivalent metal ion is used the resulting polyesters or polyesteramides are not ordinarily easily dissipated by cold water but are more readily dissipated in hot water. Depending on the end use of the polymer, either of the different sets of properties may be desirable. It is possible to prepare the polyester or polyesteramide using, for example, a sodium sulfonate salt and later by ion-exchange replace this ion with a different ion, for example, calcium, and thus alter the characteristics of the polymer. In general, this procedure is superior to preparing the polymer with divalent metal salt inasmuch as the sodium salts are usually more soluble in the polymer manufacturing components than are the divalent metal salts. Polymers containing divalent or trivalent metal ions are less elastic and rubber-like than polymers containing monovalent ions. One such metallosulfoaryl sulfonate component may be prepared as shown by the following general reactions which are exemplified in the examples below:

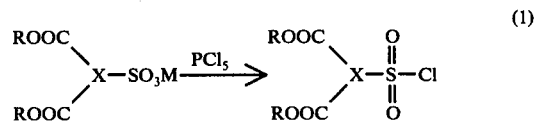

(1)

(II)

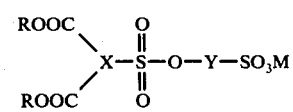

Many variations of these reactions may be employed. For example, the sulfonyl chloride intermediate may be prepared from either the sulfonic acid or a salt thereof, and other chlorinating agents (e.g., thionyl chloride, phosphorus trichloride, phosphorous oxychloride) may be used. In addition, the reaction between the sulfonyl chloride and the sulfophenol may be carried out in water or an inert organic solvent, and the base used may be an alkali metal hydroxide or a tertiary amine. Such suitable compounds are disclosed in U.S. Pat. No. 3,734,874 which are incorporated herein by reference.

The α,β-unsaturated acids (d) are described by the following structure:

wherein R is H, alkylcarboxy, or arylcarboxy and R¹ is carboxy or arylcarboxy. Polymers derived from the above components can be used in combination with polymers derived from other components and/or in combination with other ethylenically unsaturated comonomers (e.g., acrylic acid, acrylamide, butyl acrylate, diacetone acrylamide). The comonomers can be from 1–75 parts by weight, preferably 5–25 parts by weight.

Advantageous difunctional components which are aminoalcohols include aromatic, aliphatic, heterocyclic and other types as in regard to component (e). Specific examples include 5-aminopentanol-1, 4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —CR$_2$-OH group.

Such difunctional monomer components which are aminocarboxylic acids include aromatic aliphatic, heterocyclic, and other types as in regard to component (e) and include lactams. Specific examples include 6-aminocaproic acid, its lactam known as caprolactam, omegaaminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Examples of such difunctional monomer component (e) which are diamines include ethylenediamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine; etc.

Greater dissipatability is achieved when the difunctional sulfo-monomer constitutes from about 6 mole percent to about 25 mole percent out of a total of 200 mole percent of (a), (b), (c), (d), and any (e) components of the polyester or polyesteramide. The total of 200 mole percent is explained below and can also be referred to as 200 mole parts.

Any of the above-identified difunctional monomers generally contain hydrocarbon moieties having from 1 to about 40 carbon atoms in addition to their two functional groups, but they may in general also contain up to six non-functional groups such as —O—, —S—, —SO$_2$—, —SO$_2$—O—, etc. For example, the poly(ethylene glycol) monomer used may contain from 1 to about 19 oxy groups, such as —O— groups.

By modifying the proportions of the various acids which make up the dicarboxylic acid component of the polyester or polyesteramide, the properties of the polymer may be varied to meet specific end uses. Therefore, as the proportion of terephthalic acid is decreased, the polymer becomes more flexible. Therefore, wide ranges of softening point and flexibility can be obtained by varying the proportions of the various acids employed as the dicarboxylic acid component. Moreover, varying the mole percentages of sulfonate-containing difunctional monomer varies the water susceptibility of the polymer. In addition, the mixture of dissipated polymer and aqueous solution is unexpectedly stable, thus demonstrating the hydrolytic stability of the polymer. Furthermore, essentially no hydrolysis of the polymer occurs during three months storage at room temperature in water and even at 50° C. in water the polymer resists hydrolytic degradation for several days.

To obtain the modified polymers of this invention, the sulfonate-containing difunctional monomer modifier may be added directly to the reaction mixture from which the polymer is made. Thus, these monomer modifiers can be used as a component in the original polymer reaction mixture. Other various processes which may be employed in preparing the novel polymers of this invention are well known in the art and are illustrated in such patents as U.S. Pat. Nos. 2,465,319; 3,018,272; 2,901,466; 3,075,952; 3,033,822; 3,033,826 and 3,033,827. These patents illustrate interchange interchange reactions as well as polymerization or build-up processes.

Whenever the term "inherent viscosity" (I.V.) is used in this description, it will be understood to refer to viscosity determinations made at 25° C. using 0.25 gram of polymer per 100 ml. of a solvent composed of 60 percent phenol and 40 percent tetrachloroethane as parts by weight. In addition, whenever the terms "dissipatable," "dissipated" or "dissipate" are used in this description, it will be understood to refer to the activity of a water, aqueous or caustic aqueous solution on the polymer. The terms are specifically intended to cover those situations wherein the solution dissolves and/or disperses the polyester or polyesteramide therein and/or therethrough. Furthermore, whenever the word "water" is used in this description, it includes not only aqueous solutions but also hot aqueous solutions and caustic aqueous solutions.

The polyesters and polyesteramides of this application have particular utility in the coatings, textile finishes and hot-melt adhesives which will dissipate and can be applied to a substrate in aqueous or caustic aqueous solutions. In many operations, it is advantageous to apply the aqueous solutions and dry the coated substrate. The dry coating of polyesters and polyesteramide is then exposed to ultraviolet light and cured. The cured coatings have good adhesion to the substrate, good flexibility and are not removed by washing with water or aqueous systems.

The present invention, moreover, also provides hot-melt crosslinked adhesives which are not dissolved or dispersed by hot aqueous solutions, and, therefore, are not affected by moisture. Many other uses exist for such a water dissipatable crosslinkable hot-melt adhesive. In addition, the present polyesters and polyesteramides have utility as crosslinkable hot-melt adhesives for paper, cloth, polyester film and other substrates. Because of their water dissipatability, the polymers of this invention have many uses not open to ordinary hot-melt adhesives. For example, it is possible to apply a water solution of the polymer to a substrate, allow the water to evaporate leaving an adherent coating of the polymer on the substrate. At some later time a bond can be formed by application of ultraviolet light. Films of the present water-soluble polymer, particularly those in which the metal ion is $Mg^{++}$ or $Ca^{++}$, have such properties and are useful for this application. There are many applications for a surface coating material which can be easily applied to give a tough adherent protective coating which will not delaminate in boiling water. These new polymers have properties which make them useful for this purpose.

Additional uses are disclosed in Shields, Hawkins and Wooten U.S. Pat. No. 3,456,008 entitled "Sizing Compositions and Fibrous Articles Sized Therewith."

This invention will be further illustrated by the following examples. The percentages are by weight unless otherwise specified.

EXAMPLE 1

Water-Dispersible Polyester Containing 5 Mole Parts 4-Carboxycinnamic Acid

Into a 500 cc., round-bottom, one-neck flask was charged:
  14.8 g. (0.05 mole) dimethyl-5-sodiosulfoisophthalate
  5.5 g. (0.025 mole) methyl-p(methoxy carbonyl) cinnamate
  70.5 g. (0.425 mole) isophthalic acid
  160.0 g. (1.50 mole) diethylene glycol
  100 ppm. Ti based on weight of polymer The flask was purged and evacuated three times with dry nitrogen prior to immersing the flask into a molten Wood's metal bath and following the schedule given below:

| Time (min.) | ° C. | Comments |
|---|---|---|
| 0 | 200 | Immerse flask and increase temperature to 220° C. |
| 135 | 220 | Increase temperature to 245° C. |
| 155 | 245 | Increase temperature to 270° C. |
| 180 | 270 | |
| 185 | 270 | Start vacuum - pressure fell to 0.5 mm. Hg |
| 205 | 270 | 0.2 mm. Hg, high melt viscosity |
| 210 | 270 | 0.2 mm. Hg, high melt viscosity - stop reaction, release vacuum to nitrogen and pour out contents onto a Teflon board for cooling. |

The resulting polymer had I.V. 0.27 and was readily dispersible in water at 10% solids level.

EXAMPLE 2

Water-Dispersible Polyester Containing 10 Mole Parts 4-Carboxycinnamic Acid

This polymer was prepared by the procedure described in Example 1. The following quantities were employed.
  14.8 g. (0.05 mole) dimethyl-5-sodiosulfoisophthalate
  11.0 g. (0.05 mole) methyl-p(methoxycarbonyl) cinnamate
  66.5 g. (0.40 mole) isophthalic acid
  160.0 g. (1.50 mole) diethylene glycol
  100 ppm. Ti based on weight of polymer.

The resulting polymer had an I.V. 0.32 and was readily dispersible in water at 10% solids level.

EXAMPLE 3

Photocuring of Polyester Compositions From Organic Solvent

A stock solution containing 10% (w/w) of polymer in $CHCl_3$ was prepared. Samples containing various additives were prepared from this stock solution and the compositions given in Table 1.

Table 1

| Sample Number | Polymer (Mole % Cinnamate) | Additive | Weight % (Based on Weight of Polymer) |
|---|---|---|---|
| 1 | 5 | None | |
| 2 | 10 | None | |
| 3 | 5 | FI-2 | 2.5 |
|   |   | CMB | 2.5 |
| 4 | 10 | FI-2 | 2.5 |
|   |   | CMB | 2.5 |
| 5 | 10 | FI-2 | 2.5 |
|   |   | CMB | 2.5 |
|   |   | Acrylic acid | 10 |
| 6 | 10 | FI-2 | 2.5 |
|   |   | CMB | 2.5 |
|   |   | Butyl acrylate | 10 |
| 7 | 5 | FI-2 | 2.5 |
|   |   | CMB | 2.5 |
|   |   | TMPT | 5 |
| 8 | 5 | FI-2 | 2.5 |
|   |   | CMB | 2.5 |
|   |   | TMPT | 10 |
| 9 | 10 | FI-2 | 2.5 |
|   |   | CMB | 2.5 |
|   |   | TMPT | 10 |
| 10 | 10 | FI-2 | 2.5 |
|   |   | CMB | 2.5 |
|   |   | Diacetone acrylamide | 10 |

FI-2 - 4,4'-Bis(isopropoxycarbonylbenzoin)isopropyl ether
CMB - 4-Chloromethyl benzophenone
TMPT - Trimethylolpropane triacrylate Samples of the above compositions were coated on glass slides and dried at 60° C. for 2 hours to give clear films having thicknesses of approximately 1 mil. These coated slides were exposed to a 70-w./in. mercury arc at a distance of 6 in. from the arc for various periods of time. The time required for the exposed coatings to become insoluble in $CHCl_3$ was determined and the results given in Table 2.

Table 2

| Composition Number | Time (Second) |
|---|---|
| 1 | >180 |
| 2 | >180 |
| 3 | 54 |
| 4 | 48 |
| 5 | 36 |
| 6 | 36 |
| 7 | 36 |
| 8 | 24 |
| 9 | 18 |
| 10 | 36 |

EXAMPLE 4

Coating From Water on Estar Film a. Samples of a solution containing 10% (weight/weight) of the polymer prepared in Example 1 and 0.25% (w/w) of 4,4'-bis(chloromethyl)benzophenone in water were coated on Estar film and the coated film dried overnight at 60° C. These coated films were exposed to a 70-w./in. of ore mercury arc at a distance of 6-in. from the arc for 60 seconds. The cured coatings had good adhesion, good flexibility and did not delaminate in boiling water. In addition, the films were readily dyeable with a blue cationic dye such as EASTACRYL Blue 5GL at room temperature and above.

b. Samples of a solution containing 10% (w/w) of polymer prepared in Example 1, 0.25% (w/w) of 4,4'-bis(chloromethyl)benzophenone and 1.0% (w/w) of diacetone acrylamide were coated, dried and irradiated as above. An exposure time of 30 seconds was required to give a coating with good adhesion, good flexibility and water insolubility.

EXAMPLE 5

Fabric samples were treated as follows: Samples 1-2 g. were coated with the photocurable composition from an aqueous solution containing 10 parts of the polymer prepared in Example 2, 1 part diacetone acrylamide and 0.25 parts 4,4'-bis-chloromethyl benzophenone. The initially coated samples were pressed between two paper towels to remove excess coating solution and allowed to dry at 80° C. for 2 hours. This time was sufficient to give a constant dry weight. The dried samples were exposed to a 1200-watt 17-inch mercury arc at a distance of 6 inches from the arc for 30 and 50 seconds on each side. The exposed samples were placed in a boiling water bath and heated with stirring for 1 hour. Aftr washing, the samples were dired at 80° C. for 2 hours and weighed. The results are given in the following table:

Table 3

| Run No. | Fabric (Structure) | Add On (%) | Time Irr. (sec.) | % Loss |
| --- | --- | --- | --- | --- |
| 1 | Polyethylene terephthalate (knit) | 8.8 | 0 | 92 |
| 2 | Polyethylene terephthalate (knit) | 7.1 | 30 | 10.0 |
| 3 | Polyethylene terephthalate (knit) | 7.7 | 50 | 8.0 |
| 4 | Polyethylene terephthalate (woven) | 3.7 | 0 | 89 |
| 5 | Polyethylene terephthalate (woven) | 5.8 | 30 | 9.0 |
| 6 | Polyethylene terephthalate (woven) | 5.5 | 50 | 5.0 |
| 7 | Polyethylene terephthalate/-Cotton (50/50) (woven) | 5.2 | 0 | 85 |
| 8 | Polyethylene terephthalate/-Cotton (50/50) (woven) | 5.7 | 30 | 9.7 |
| 9 | Polyethylene terephthalate/-Cotton (50/50) (woven) | 5.7 | 50 | 6.9 |

EXAMPLE 6

Water-Dispersible Polyester Containing 10 Mole Parts Stilbene Dicarboxylate

This polymer was prepared by the procedure described in Example 1. The following quantities were used.

14.8 g. (0.05 mole) dimethyl-5-sodiosulfoisophthalate
66.5 g. (0.40 mole) isophthalic acid
160.0 g. (1.5 mole) diethylene glycol
13.8 g. (0.05 mole) 4,4'-dicarbomethoxystilbene
100 ppm Ti based on weight of polymer.

The resulting polymer had an I.V. of 0.29 and was readily dispersible in water at 10% solids level.

EXAMPLE 7

Water-Dispersible Polyester Containing 5 Mole Parts 4-Carboxycinnamic Acid and 5 Mole Parts Maleic Acid This polymer was prepared by a procedure similar to that described in Example 1 except that maleic anhydride was added in the final stages of reaction and at a reaction temperature of 200° C.

The following quantities were employed:

13.9 g. (0.047 mole) dimethyl-5-sodiosulfoisophthalate
5.5 g. (0.025 mole) methyl-p(methoxycarbonyl)cinnamate
60.2 g. (0.362 mole) isophthalic acid
58.4 g. (0.55 mole) diethylene glycol 2.5 g. (0.025 mole) maleic anhydride
100 ppm Ti based on weight of polymer.

The resulting polymer had an I.V. of 0.36 and was readily dispersible in water at 10% solids level.

EXAMPLE 8

Water-Dispersible Polyester

This polymer was prepared by the procedure described in Example 1. The following quantities were used.

29.6 g. (0.10 mole) dimethyl-5-sodiosulfoisophthalate
133.0 g. (0.80 mole) isophthalic acid
320.0 g. (3.0 mole) diethylene glycol
100 ppm (Ti) based on weight of polymer.

The I.V. of the polymer was 0.25.

EXAMPLE 9

Water-Dispersible Polyester Containing 5 Mole Parts Acrylate

A sample (25 g.) of the polyester prepared in Example C was dissolved in 500 ml. of chloroform. To this was added excess (10 g.) acrylic anhydride. The solution was stirred at room temperature for 48 hours. Removal of the volatile components was accomplished by stripping at room temperature and reduced pressure followed by heating to 50° C. under a vacuum (0.05-0.10 mm. of Hg.). N.m.r. analysis of the material showed an acrylate content of 5 ± 0.2%. The contents of the flask were then dissolved in 250 ml. of water and 5 mg. of hydroquinone monomethylether added.

EXAMPLE 10

Water-Dispersible Polyester Containing 5 Mole Parts Methacrylate

This polymer was prepared by the procedure used in Example D. The material had a methacrylate content of 5.5 ± 0.2% by nmr., was dissolved in water and stabilized with hydroquinone monomethylether.

EXAMPLE 11

Water-Dispersible Polyester Containing 5 Mole Parts 4-Carboxycinnamate and 5 Mole Parts Acrylate This polymer was prepared by the procedure used in Example D except that 25 g. of the polymer prepared in Example 1 was reacted with the acrylic anhydride. This material had an acrylate content of 4.8 ± .2% by nmr., was dissolved in water and stabilized.

EXAMPLE 12

Samples of woven polyester fabric were coated with water dispersible coatings from aqueous solution containing 4,4'-bis-chloromethyl benzophenone as photoinitiator. These fabric samples were dried at 80° C. for 2 hours, followed by exposure to a 1200-watt 17-in mercury arc at a distance of 6 inches for 40 seconds on each side. The exposed samples were placed in a boiling water bath and heated with stirring for 1 hour. The samples were dried to a constant weight and the percent loss of additive determined. The results are as follows:

Table 4

| Water-Dispersible Coating | Add On (%) | Time Irr. (sec.) | % Loss |
|---|---|---|---|
| 1 | 7.2 | 0 | 87 |
| 1 | 7.2 | 40 | 12 |
| 1 | 7.0 | 40 | 12 |
| 2 | 8.9 | 0 | 92 |
| 2 | 8.9 | 40 | 10 |
| 6 | 8.1 | 0 | 90 |
| 6 | 8.1 | 40 | 8.0 |
| 7 | 7.0 | 0 | 85 |
| 7 | 7.0 | 40 | 9.1 |
| 8 | 9.3 | 0 | 89 |
| 8 | 9.3 | 40 | 89 |
| 9 | 8.2 | 0 | 68 |
| 9 | 8.2 | 40 | 9.0 |
| 10 | 8.6 | 0 | 72 |
| 10 | 8.6 | 40 | 8.8 |
| 11 | 7.5 | 0 | 52 |
| 11 | 7.5 | 40 | 6.0 |

It is readily apparent that this invention includes the polymers as defined when dissipated in water whether the water be (1) hot, (2) cold, (3) alkaline aqueous solutions, or any other aqueous media including organic or inorganic solutes, organic liquids, organic dyes, pigments, stabilizers or other additives, any of which substances may be present therein for the purpose of contributing to the intended end use. When the expression "hot water" is used, it means water at about 80°-90° C. unless otherwise set forth. When the only liquid present is water, the water-dissipated polymer generally contains 0.1 to 55% by weight of polymer based on the sum of the polymer and water; advantageous ranges for various end uses include 10 to 40% polymer, especially 20 to 35% polymer, etc. However, when other substances are also present, these percentage ranges may be considerably different.

The invention has been described in detail with particular reference to preferred embodiments thereof, but it will be understood that variations and modifications can be effected within the spirit and scope of the invention as described hereinabove.

We claim:

1. A linear, radiation crosslinkable, water-dissipatable polymer having carbonyloxy interconnecting groups in the linear molecular structure and having an inherent viscosity of at least about 0.1 measured in a 60/40 parts by weight solution of phenol/tetrachloroethane at 25° C. and at a concentration of about 0.25 gram of polymer in 100 ml. of said solvent, said polymer being prepared from components comprising:
   a. at least one unsubstituted saturated aliphatic, unsubstituted saturated cycloaliphatic or unsubstituted aromatic dicarboxylic acid combining no ethylene unsaturation;
   b. at least one difunctional glycol containing two —CH$_2$—OH groups of which at least 15 mole percent is a poly(ethylene glycol) having the structural formula:

H(OCH$_2$-CH$_2$)$_n$OH n being an integer in the range between about 2 and about 20;
   c. an amount sufficient to provide said water-dissipatable characteristic of said polymer of at least one difunctional sulfomonomer containing at least one metal sulfonate group attached to an aromatic nucleus wherein the functional groups are hydroxy, carboxyl or amino;
   d. an α,β-unsaturated acid having the formula:

R—CH=CH—R$^1$ wherein R is H, alkyl or arylcarboxy and R$^1$ is carboxy or arylcarboxy.

2. A linear, radiation crosslinkable, water dispersible polymer according to claim 1 which also contains up to 80 mole percent of a difunctional hydroxycarboxylic acid having one —CH$_2$—OH group, an aminocarboxylic acid having one —NRH group, an amino-alcohol having one —CH$_2$—OH group and one —NRH group, a diamine having two —NRH groups, or a mixture thereof, wherein each R is an H atom or a 1-4 carbon alkyl group.

3. A linear, crosslinkable polymer according to claim 2 wherein said difunctional sulfo-monomer (c) is a dicarboxylic acid which constitutes about 8 mole percent to about 50 mole percent, based on the sum of all acid equivalents.

4. A linear, crosslinkable water-dissipatable polymer according to claim 2 wherein said difunctional sulfomonomer (c) is a glycol which constitutes about 8 mole percent to about 50 mole percent based on the sum of all the hydroxy or hydroxy and amino equivalents.

5. A linear, crosslinkable, water-dissipatable polymer according to claim 3 wherein said difunctional sulfomonomer (c) is present in from 10 to 50 mole percent.

6. A linear, crosslinkable, water-dissipatable polymer according to claim 4 wherein said difunctional sulfomonomer (c) is present in from 10 to 50 mole percent.

7. A linear, crosslinkable, water-dispersible polymer according to claim 2 wherein said difunctional sulfomonomer (c) is an aromatic dicarboxylic acid and the metal sulfonate group is attached to the aromatic nucleus thereof.

8. A linear, crosslinkable, water-dispersible polymer according to claim 7 wherein the metal of the sulfonate group is selected from the group consisting of Na, Li, K, Mg, Ca, Ba, Cu, Ni, Fe, and mixtures thereof.

9. A linear, crosslinkable, water-dispersible polymer according to claim 2 wherein said difunctional sulfomonomer (c) is isophthalic acid containing a metal sulfonate group attached to the aromatic ring.

10. A linear, crosslinkable, water-dispersible polymer according to claim 9 wherein said difunctional sulfomonomer (c) is isophthalic acid containing a sodiosulfonate group.

11. A linear, crosslinkable, water-dispersible polymer according to claim 10 wherein said sodiosulfonate group is attached to the isophthalic acid in the 5-position.

12. A linear, crosslinkable water-dispersible polymer according to claim 11 comprising the reaction product of:
   a. at least 80 mole percent isophthalic acid;
   b. diethylene glycol;
   c. about 10 mole percent 5-sodiosulfoisophthalic acid; and
   d. at least 5 mole percent acrylic acid.

13. A linear, crosslinkable, water-dispersible polymer according to claim 11 comprising the reaction product of:
   a. at least 80 mole percent isophthalic acid;
   b. diethylene glycol;

c. about 10 mole percent 5-sodiosulfoisophthalic acid; and d. at least 5 mole percent methacrylic acid.

14. A linear, crosslinkable, water-dispersible polymer according to claim 11 comprising the reaction product of:

a. about 80 mole percent isophthalic acid;
b. about 100 mole percent diethylene glycol;
c. about 10 mole percent 5-sodiosulfoisophthalic acid; and
d. about 10 mole percent 4-carboxycinnamic acid.

15. A linear, crosslinkable, water-dispersible polymer according to claim 11 comprising the reaction product of:

a. about 80 mole percent isophthalic acid;
b. about 100 mole percent diethylene glycol;
c. about 10 mole percent 5-sodiosulfoisophthalic acid; and
d. about 10 mole percent 4,4'-stilbenedicarboxylic acid.

* * * * *